(12) United States Patent
Hopfenmuller

(10) Patent No.: US 6,583,868 B2
(45) Date of Patent: Jun. 24, 2003

(54) METHOD OF ALIGNING AN ACC-SENSOR ON A VEHICLE

(75) Inventor: Georg Hopfenmuller, Freising (DE)

(73) Assignee: Bayerische Motoren Werke Aktiengesellschaft, Muenchen (DE)

(*) Notice: Subject to any disclaimer, the term of this patent is extended or adjusted under 35 U.S.C. 154(b) by 0 days.

(21) Appl. No.: 09/761,745

(22) Filed: Jan. 18, 2001

(65) Prior Publication Data

US 2001/0008446 A1 Jul. 19, 2001

(30) Foreign Application Priority Data

Jan. 18, 2000 (DE) ........................ 100 01 783

(51) Int. Cl.⁷ .................. G01B 11/26; G01B 5/255; G01C 1/00; G08G 1/00
(52) U.S. Cl. .................. 356/139.09; 33/288; 340/904
(58) Field of Search ................ 356/3.01–5.15, 356/139.09, 155, 399; 33/288; 342/70, 71, 174; 343/703, 711; 340/903–904

(56) References Cited

U.S. PATENT DOCUMENTS

| 4,134,680 A |   | 1/1979  | Hunter et al. |
|-------------|---|---------|---------------|
| 4,338,027 A | * | 7/1982  | Eck ........................... 356/155 |
| 4,416,065 A | * | 11/1983 | Hunter ..................... 33/203.15 |
| 4,615,618 A | * | 10/1986 | Bailey et al. ............... 356/152 |
| 4,716,298 A | * | 12/1987 | Etoh .......................... 250/561 |
| 4,854,702 A |   | 8/1989  | Stieff |
| 5,298,905 A | * | 3/1994  | Dahl ........................... 342/54 |
| 5,313,213 A | * | 5/1994  | Neumann et al. ........... 342/165 |
| 5,621,514 A | * | 4/1997  | Paranto et al. ............. 356/5.09 |
| 5,886,781 A | * | 3/1999  | Muller et al. .......... 356/139.09 |
| 5,948,024 A | * | 9/1999  | O'Mahoney et al. ......... 701/29 |
| 6,087,995 A | * | 7/2000  | Grace et al. ................. 343/703 |
| 6,134,792 A | * | 10/2000 | January .................... 33/203.18 |
| 6,185,499 B1 | * | 2/2001 | Kinoshita et al. ............. 701/96 |
| 6,195,157 B1 | * | 2/2001 | Yamashita et al. ......... 356/4.01 |
| 6,301,003 B1 | * | 10/2001 | Shirai et al. ............... 356/4.01 |
| 6,363,619 B1 | * | 4/2002  | Schirmer et al. .............. 33/288 |

FOREIGN PATENT DOCUMENTS

| DE | 197 07 590 A1 | 2/1997 |
| WO | 98/38691 | 9/1998 |

* cited by examiner

*Primary Examiner*—Thomas H. Tarcza
*Assistant Examiner*—Brian Andrea
(74) *Attorney, Agent, or Firm*—Crowell & Moring LLP

(57) ABSTRACT

A method of aligning an ACC-sensor on a vehicle includes the following steps: (a) arranging a reflection surface in front of the vehicle for reflecting emitted ACC-sensor rays; (b) aligning the horizontal axis of the reflection surface parallel to the rear axle of the vehicle; (c) aligning the vertical axis of the reflection surface essentially perpendicular to the longitudinal axis of the vehicle which is defined by the alignment of the front and rear axle; and (d) adjusting the ACC-sensor such that a defined or maximal fraction of the emitted rays is reflected.

6 Claims, 2 Drawing Sheets

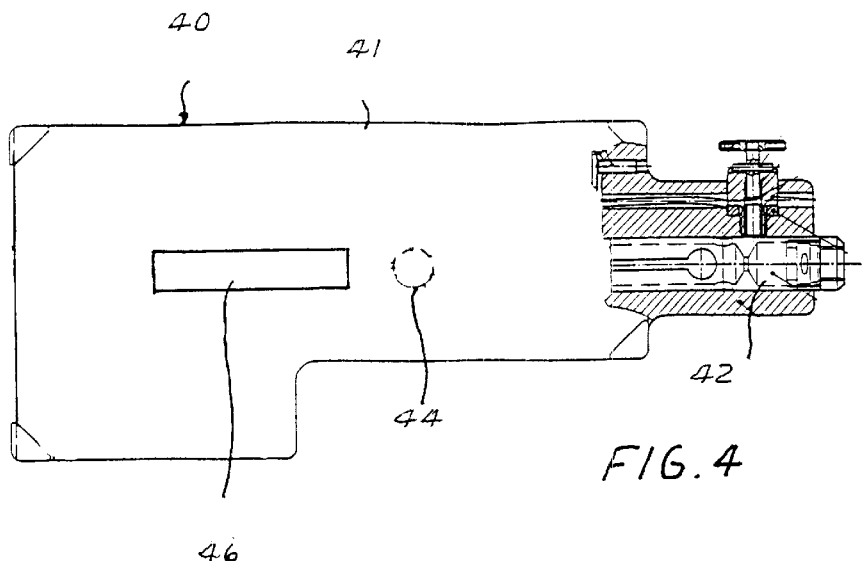
FIG. 4
FIG. 5
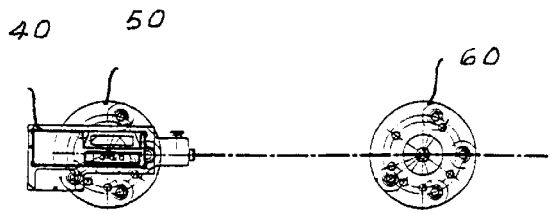
FIG. 6
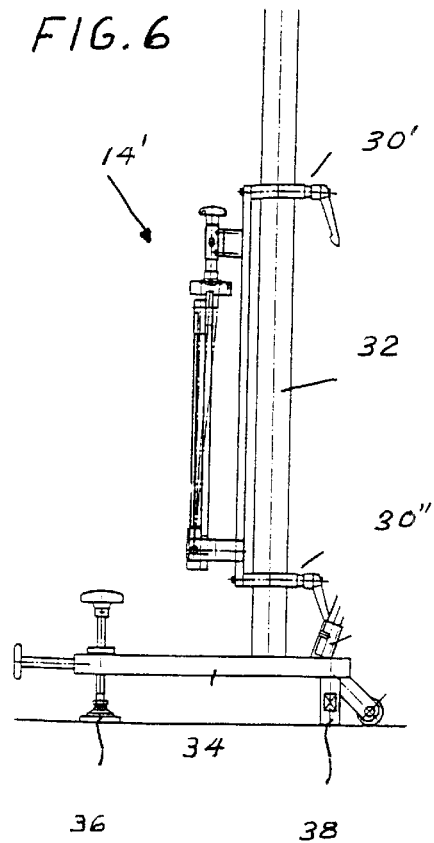

METHOD OF ALIGNING AN ACC-SENSOR ON A VEHICLE

BACKGROUND AND SUMMARY OF THE INVENTION

This application claims the priority of German patent document 100 01 783.5, filed Jan. 18, 2000, the disclosure of which is expressly incorporated by reference herein.

The invention relates to a method of aligning an ACC-sensor (Adaptive Cruise Control Sensor) on a vehicle.

An ACC-sensor is a sensor which detects objects in the forward-moving range of a vehicle by emitting and receiving rays. Such sensors permit automatic vehicle control devices, for example, to maintain a particular distance from a vehicle driving ahead or to carry out a certain action when an obstacle suddenly appears in front of a vehicle. Such ACC-sensors operate, for example, on a laser, microwave or ultrasound basis.

To ensure accurate operation, such an ACC-sensor must be aligned correctly relative to the longitudinal direction of the vehicle itself, because a faulty alignment can lead to a malfunction of a corresponding control system.

German Patent Document DE 197 07 590 A1 discloses a method and apparatus for adjusting a distance sensor. In one embodiment, a reflector unit at a distance in front of the vehicle is aligned with respect to its body. A servicing unit then aligns the distance sensor based on the reflected rays. However, because the alignment of the reflector unit is performed with respect to the vehicle body, faulty adjustments may occur.

It is an object of the present invention, to provide a method of aligning an ACC-sensor on a vehicle which minimizes alignment errors.

This and other objects and advantages are achieved by the alignment method according to the invention, in which a reflection surface, such as a mirror, is used which reflects the rays emanating from the ACC-sensor onto a receiver situated in the ACC-device. When the reflection surface is aligned accurately, the ACC-sensor can be properly set up by adjusting it so that a defined or maximal fraction of the emitted radiation is reflected.

A main problem addressed by the invention therefore consists of accurately aligning the reflection surface. This is accomplished by aligning the horizontal axis of the reflection surface in parallel with the rear axle of the vehicle. The vertical axis of the reflection surface is aligned essentially perpendicular to the longitudinal axis of the vehicle, which is defined by the alignment of the front and rear axles.

As a result of the invention, faulty adjustments are prevented during the alignment of the ACC-sensor. The invention thus provides a significant advantage over prior alignment systems, in which the ACC-sensor is aligned according to the body of a vehicle as described previously. Such systems do not ensure that the ACC-sensor is actually aligned in the longitudinal direction of the vehicle, because the latter direction is defined not by the vehicle body, but by the position of the rear axle of the vehicle. In addition, the mutual orientation of the front and rear axles of the vehicle must also be taken into account for a vertical alignment, in order to ensure that the sensor will not emit its radiation too far downward or upward.

According to a preferred embodiment of the invention, on both sides of the vehicle the distance between the rear axle and the horizontal axis of the reflection surface is set to be identical. For this purpose, a measuring instrument, particularly a measuring tape, can be used, by means of which markings are made on both sides of the vehicle. The reflection surface can now be adjusted with respect to these markings. This takes place, for example, by using a laser pointer which is disposed relative to the reflection surface such that its laser beam extends parallel to the horizontal axis of the mirror. When the laser beam is then directed toward the markings, a parallel alignment of the horizontal axis of the reflection surface is ensured with respect to the rear axle of the vehicle.

For the essentially perpendicular alignment of the vertical axis of the reflection surface with respect to the longitudinal axis of the vehicle, the alignment of the longitudinal axis of the vehicle can be determined, for example, by means of a laser pointer which has a leveling device. The leveling device will then indicate the angle formed by a straight line that connects the two axles relative to the horizontal line. If the reflection surface is now set up such that its vertical axis is situated to be rotated by 90 degrees with respect to the defined angle, a proper vertical alignment of the reflection surface is achieved.

The present invention provides a simple and cost-effective possibility for aligning an ACC-sensor in the case of a vehicle.

Other objects, advantages and novel features of the present invention will become apparent from the following detailed description of the invention when considered in conjunction with the accompanying drawings.

BRIEF DESCRIPTION OF THE DRAWINGS

FIG. 4 is a schematic depiction of a laser pointer for implementing the present invention;

FIG. 5 illustrates defining of the alignment of a longitudinal axis of the vehicle; and FIG. 6 is a schematic representation of an alignable mirror.

DETAILED DESCRIPTION OF THE DRAWINGS

Figure 1:
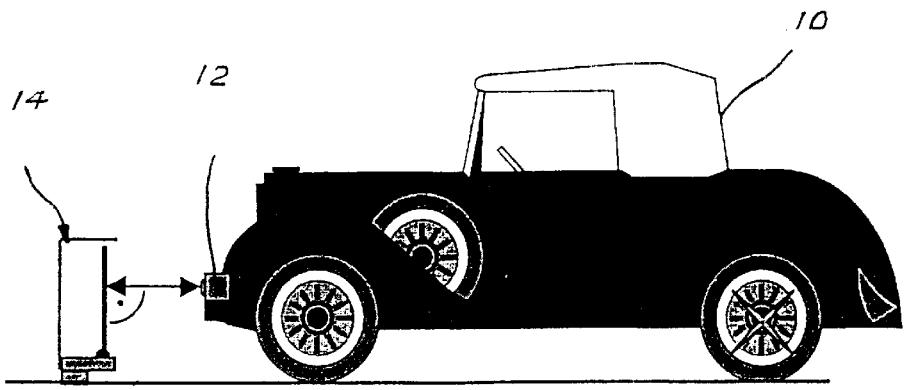
FIG. 1 is a view of a mirror set up in front of a vehicle with an ACC-sensor.
Figure 2:
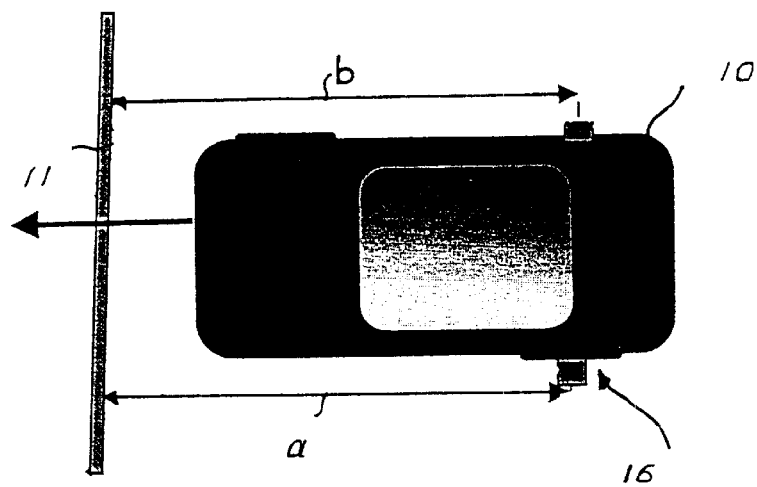
FIG. 2 is a view of a mounting of a marking which extends parallel to the rear axle of the vehicle.

FIG. 1 is a schematic view of a vehicle 10 having an ACC-sensor 12 with a transmitting and a receiving unit (neither shown in detail). In front of the vehicle, a reflection unit 14 is set up which directly reflects the rays emitted by the ACC-sensor 12, so that an adjustment of the sensor is easily possible. In the present case, the sensor 12 is adjusted such that the majority of the emitted rays are reflected back and received. For this purpose, it is apparent that a perfect alignment of the reflection unit 14 is essential. The approach for the precise alignment for this purpose will be explained in the following:

FIG. 2 illustrates that a marking 11 is disposed mounted in front of the vehicle 10. On both sides of the vehicle, this marking has an identical distance a and b from the rear axle 16 of the vehicle 10. For this purpose, the same distance is measured on both sides of the vehicle, for example, by means of a measuring tape and the marking 11 is provided on the ground. The horizontal axis of the reflection unit 14 is now arranged parallel with respect to this marking 11. This can take place in that a laser pointer 40, which is shown only schematically in FIG. 4, is placed on the reflection unit 14 such that the laser beam emitted by the laser pointer 40 extends parallel to the marking 11.

The laser pointer 40 according to FIG. 4 has a housing 41 in which, in the front, a laser unit 42 is arranged for emitting the laser beam. By means of a bore 44 provided in the housing 41 of the laser pointer, the laser pointer 40 is rotatably fitted onto the bolt of an adapter which, in turn, is arranged on the rear wheels. The laser pointer 40 also includes a leveling device 46 which can determine the swivelling of the laser beam axis with respect to the horizontal line. The leveling device 46 can be operated mechanically or electronically.

To determine the alignment of the longitudinal axis of the vehicle, the laser pointer 40 together with its bore 44 is placed on the bolt of an adapter 50 (compare FIG. 5) which is arranged on the rear wheel. The bore 44 is aligned with the extension (axis) of the laser beam of the laser device 42. By rotating the laser pointer 40 around the axis of the bore 44 or of the bolt, the laser beam can be aligned with a pin of an adapter 60 which is arranged on the front wheel of the front axle (also compare FIG. 5). After the alignment, the deviation of the laser axis from the horizontal line can be determined on the leveling device 46.

Figure 3:
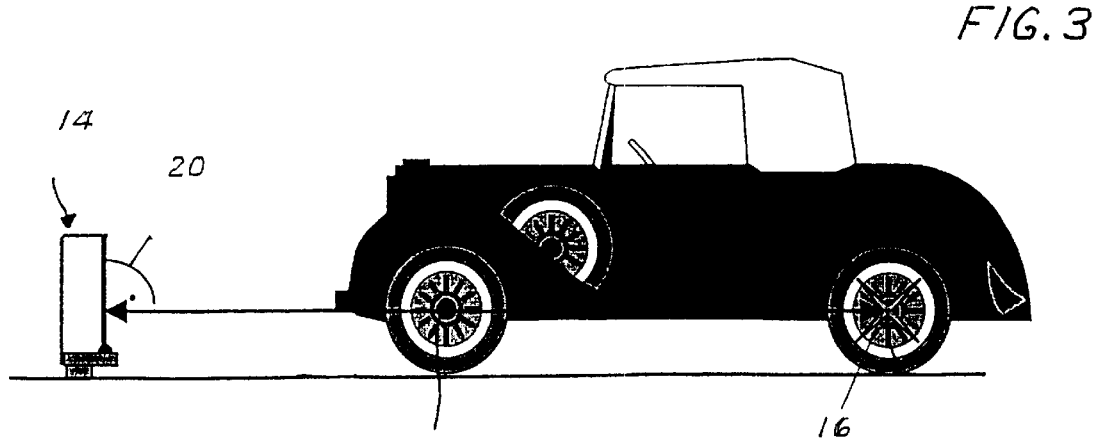
FIG. 3 is a view of a perpendicular alignment of a vertical axis of a mirror with respect to a longitudinal axis of the vehicle.

By means of this position information, the vertical axis of the reflection unit 14 is adjusted such that its reflection surface extends at an angle of 90 degrees (reference number 20 in FIG. 3) with respect to the just determined longitudinal axis of the vehicle.

FIG. 6 illustrates another reflection unit 14', in which the reflection shield is fastened by means of two clamps 30' and 30" to a holding mast 32 which in turn, is arranged on a base 34 supported on the ground by feet 36 and 38. The foot 36 has an external thread which is received in an internal thread of the plate 34; thus, the base plate 34 and (by way of the holding mast 32) the reflection surface of the reflection unit 14' can be swivelled. The alignment takes place as described above.

The present method allows a precise alignment of a reflection surface, for example, of a mirror, with respect to the rear axle of the vehicle or the longitudinal axis of a vehicle. After the precise aligning of the mirror, the ACC sensor can be optimally adjusted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of aligning an ACC-sensor on a vehicle, comprising:

arranging a reflection surface in front of the vehicle for reflecting emitted ACC-sensor rays;

aligning a horizontal axis of the reflection surface parallel to a rear axle of the vehicle;

aligning a vertical axis of the reflection surface substantially perpendicular to a longitudinal axis of the vehicle defined by alignment of front and rear axles of the vehicle; and adjusting the ACC-sensor so that a defined or maximal fraction of the emitted rays is reflected;

wherein said step of aligning the horizontal axis of the reflection surface is performed by setting a distance between the rear axle and the horizontal axis of the reflection surface to be the same on both sides of the vehicle.

2. The method according to claim 1, wherein for setting the same distance:

markings which are equidistant from the rear axle are provided by means of a measuring instrument on both sides of the vehicle; and the reflection surface is adjusted relative to these markings.

3. The method according to claim 2, wherein for adjusting the reflection surface relative to the two markings, a laser pointer is used which is placed on the reflection surface such that the laser beam extending parallel to the horizontal axis of the reflection surface is congruent with the markings.

4. A method of aligning an ACC-sensor on a vehicle, comprising:

arranging a reflection surface in front of the vehicle for reflecting emitted ACC-sensor rays;

aligning a horizontal axis of the reflection surface parallel to a rear axle of the vehicle;

aligning a vertical axis of the reflection surface substantially perpendicular to a longitudinal axis of the vehicle defined by alignment of front and rear axles of the vehicle; and adjusting the ACC-sensor so that a defined or maximal fraction of the emitted rays is reflected; wherein the position of the longitudinal axis of the vehicle is determined using a laser pointer, which has a leveling device and which is aligned with the rear and front axle; and the vertical axis of the reflection surface is adjusted relative to the position of the longitudinal axis.

5. A method of aligning a vehicle sensor relative to a travel direction of the vehicle, comprising:

arranging a reflection surface in front of the vehicle for reflecting radiation emitted by said sensor;

providing adapters mounted on rear wheels of the vehicle and disposed at a fixed longitudinal position relative to the longitudinal position of a rear axle of the vehicle;

aligning the reflection surface so that the distance from the reflection surface to the adapters is the same on both sides of the vehicle; and adjusting said sensor to maximize reflected radiation detected by it.

6. The method according to claim 5, further comprising:

aligning a vertical axis of the reflection surface substantially perpendicular to a longitudinal axis of the vehicle defined by alignment of front and rear axles of the vehicle.

* * * * *